United States Patent Office.

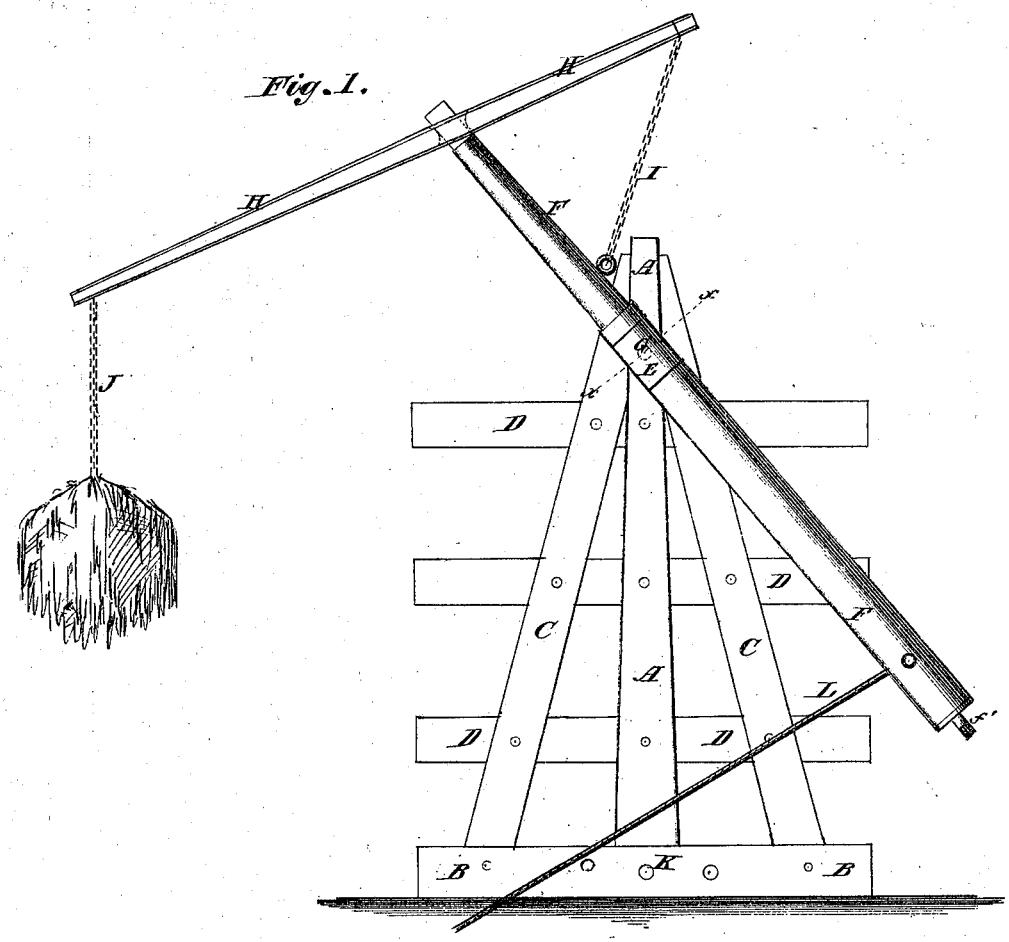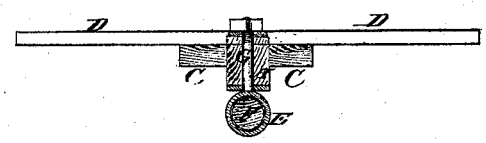

J. G. SEHORN, OF IOWA CITY, IOWA.

Letters Patent No. 94,846, dated September 14, 1869.

IMPROVEMENT IN HAY-LOADERS.

The Schedule referred to in these Letters Patent and making part of the same.

*To all whom it may concern:*

Be it known that I, J. G. SEHORN, of Iowa City, in the county of Johnson, and State of Iowa, have invented a new and useful Improvement in Hay-Loaders; and I do hereby declare that the following is a full, clear, and exact description thereof, which will enable others skilled in the art to make and use the same, reference being had to the accompanying drawings, forming part of this specification, in which—

Figure 1 is a front view of my improved hay-loader.

Figure 2 is a detail sectional view of the same, taken through the line $x$ $x$, fig. 1.

Similar letters of reference indicate corresponding parts.

My invention has for its object to furnish an improved device designed especially for loading hay upon a wagon-rack, but which shall be equally applicable for loading manure, dirt, and other heavy weights, and which shall at the same time be simple in construction, easily operated, and effective in operation; and It consists in the construction and combination of various parts of the device, as hereinafter more fully described.

A represents a post, the lower end of which is securely framed into the cross-bar B, which may be a part of the hay-rack, or may be attached to the wagon.

The post A should be strengthened with braces, C, and may be provided with cross-bars, D, to prevent the loading from interfering with the proper operation of the device.

E is a band or sleeve, which passes around the middle part of the bar F, to which band is attached a bolt, G, which passes through and works in a hole in the upper end of the post A, so as to swivel the bar F to said post.

The bar F is kept from moving up in the band E by means of a shoulder formed upon said bar F, or by a ring or band passing around and attached to it, and is kept from moving down in said band E by a band or ring passing around and secured to it, so that the bar F may revolve freely in the band or sleeve E, but cannot move longitudinally in it.

Upon the upper end of the bar F is formed a tenon, which enters a mortise in the bar H.

The end of the short arm of the bar H is connected with the bar F, by a short brace-chain, I, which keeps the bars F and H in their proper relative position, and by adjusting the length of which the lift of the forward or working-end of the bar H may be adjusted as required.

To the end of the long arm of the bar H is attached a chain, J, to which a hay-fork, scraper, or weight to be raised is attached, according to the character of the material for raising which the machine is to be used.

Upon the lower end of the bar F is formed a round tenon, or to it is attached a short pin, $f'$, which strikes against a pin, K, placed in a hole in the bar B, to serve as a stop to the bar F, and as a support upon which the lower end of said bar revolves.

Several holes are formed in the bar B, for the reception of the pin K, so that the position in which the bar F is stopped may be regulated as desired.

To the lower part of the bar F, at right angles to the bar H, is attached one end of a rope, L, which passes around a guide-pulley pivoted to some suitable part of the frame-work A B C, and to the other end of which is attached the horse or other power by which the weight is raised.

It will be observed, that by passing the rope through a hole in the bar F, which is made at right angles to the bar H, the point of tension will not be in line with the latter, and hence the rotation of both bars will be the result so soon as sufficient power is applied and the pin $f'$ strikes the pin K.

In using the device, the rope L is slackened, which allows the end of the long arm of the bar H to drop to the ground.

When loaded, the rope L is drawn forward, which first raises the bar F to a vertical position, and then revolves it through one quarter of a revolution, swinging the loaded end of the bar H over the wagon, when the load is dropped into place in the ordinary manner.

Having thus described my invention,

What I claim as new, and desire to secure by Letters Patent, is—

The adjustable chain-brace I, swivelled band or sleeve E G, and rotating bar F, in combination with each other and with the bar H, post A, cross-bar B, adjusting stop-pin K, and rope L, substantially as herein shown and described, and for the purpose set forth.

J. G. SEHORN.

Witnesses:
 JOHN P. IRISH,
 U. H. SMITH.